No. 671,523. Patented Apr. 9, 1901.
A. LOHBILLER.
SAFETY VALVE.
(Application filed Dec. 6, 1900.)
(No Model.)
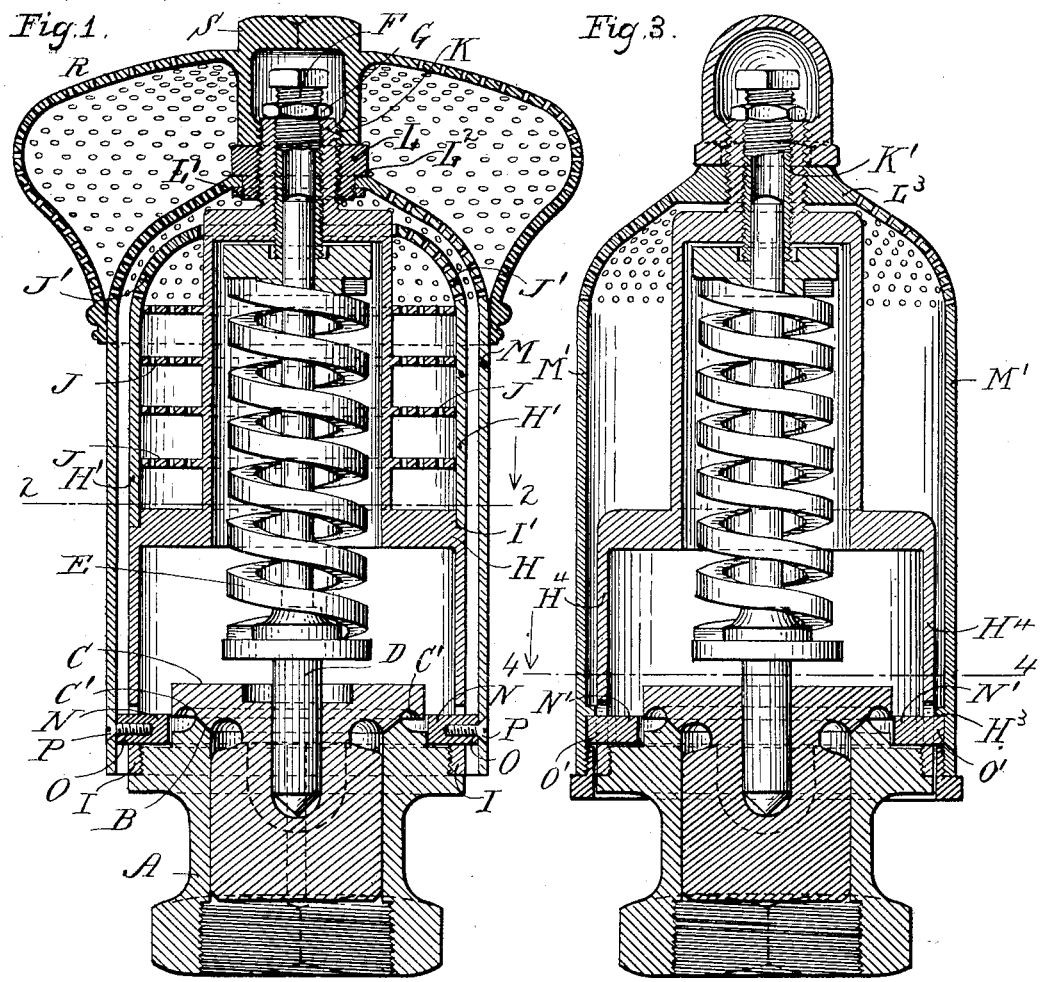
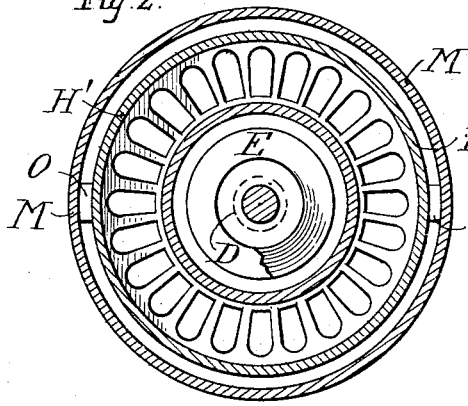
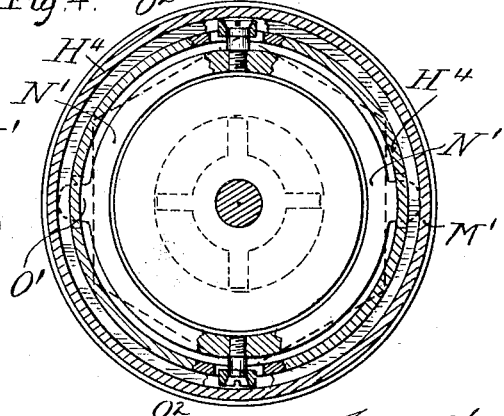
Witnesses:
L. W. Muirhead,
Wm. R. Patterson.
Inventor:
Anton Lohbiller
per Eugene Humphrey
his atty.

UNITED STATES PATENT OFFICE.

ANTON LOHBILLER, OF BOSTON, MASSACHUSETTS.

SAFETY-VALVE.

SPECIFICATION forming part of Letters Patent No. 671,523, dated April 9, 1901.

Application filed December 6, 1900. Serial No. 38,363. (No model.)

*To all whom it may concern:*

Be it known that I, ANTON LOHBILLER, a citizen of the United States, residing at Boston, in the county of Suffolk and State of Massachusetts, have invented a new and useful Improvement in Safety-Valves for Steam-Boilers, of which the following is a specification.

My invention relates to adjustable means of regulating the discharge of steam from such valves when the boiler is relieved thereby and in connection therewith to means for muffling the discharged steam; and the object of the invention is to effect economy and simplicity in the construction of such devices and to facilitate the adjustment of the same. I attain said object by means of the mechanism illustrated in the accompanying drawings, in which—

Figure 1 is a central vertical section of a valve embodying my invention. Fig. 2 is a cross-section of the same, taken as on line 2 2, Fig. 1, and as viewed from above said line. Fig. 3 is a vertical section similar to Fig. 1, but showing a modification of the connected muffling and steam-regulating parts; and Fig. 4 is a cross-section of the same, taken as on line 4 4, Fig. 3, and as viewed from above said line.

The valve illustrated in the drawings contains many features that are common and well known, and it is therefore considered unnecessary to particularly describe the same, including the base A, which comprises the valve-seat B; the valve C, having an annular groove C' in its under side; the spindle D, seated in the valve, and depressing-spring E and its hollow pressure-screw F, with its check-nut G. The inner casing, which surrounds the valve-seat, valve, and depressing-spring, is made in two sections, the lower section H of which is screwed to the base at I and the upper section H' of which is screwed to the circular rim or top of section H at I', as shown. The upper section H' has a series of interior perforated partitions J, as shown, which, together with its perforations J' through its top, serve to help muffle the escaping steam to prevent the disagreeable noise thereof, and from section H' there arises a neck K, which is threaded internally and externally and through which the depressing-screw F acts on the top of spindle D. Upon the outside of the neck is threaded a nut L, and on the lower end of the nut is a ring L', which extends around the nut, so as to leave an annular space $L^2$ between the head of the nut and the ring. An outside muffler-casing M is suspended by its top from the nut L, being embraced between part L and ring L' in space $L^2$. The body of this case M hangs down over and around the case H and has a limited vertical adjustment without rotative movement through the turning of nut L. A relief-ring N, having ears O extended through slots $H^2$ in case H, is secured to case M by screws P and is permitted, by means of said slots in case H, to rise and fall slightly, according to the vertical adjustment of the case M, to which the ring N is thus attached. The "blow-back" space, which is opened by the lifting of the valve, is regulated by the adjustment of the relief-ring N relatively to the valve and according to the pressure placed upon the valve, such adjustment being accomplished by turning nut L up or down on neck K, and thus moving therewith case M and ring N accordingly.

Surmounting the parts already described as attached to the neck K, I place thereon a cap-like muffler which affords greater expansiveness of the steam within the valve-casings, and hence is more effective for its purpose. This extended superposed muffler R has a central top S, interiorly chambered to allow space for the depressing-screw and its parts and is threaded to the neck to support it in position over all. The detachable cap R serves as an auxiliary muffler to the inner permanent perforated casings and enlarges the capacity of the muffling devices in a simple and effective manner for relieving the noisy rush of the escaping steam.

In Figs. 3 and 4 of the drawings are represented a modification in the construction relating especially to the manner of connecting the relief-ring with the adjustable muffler-casing and of adjusting the latter in connection with the ring. Instead of attaching the muffler-casing M' to the neck K' by means of a nut and ring threaded together, as in the case of Fig. 1, I adapt the top $L^3$ of casing M' to serve as a nut to secure the casing to neck K', as shown in Fig. 3, and the casing is turned thereby around the neck as a center and screws up and down thereon to raise and lower the casing. The relief-ring N' is attached to the muffler-casing M' through slots H³ in the inner casing H⁴ by means of two opposite ears O', which pass through slots H³ into an interior annular groove in case M' and by two opposite screw-studs O², carrying rolls (shown in Fig. 4) which pass through vertical slots in casing H⁴ and screw into the edge of the ring N', while the trundles or rolls bear in the annular groove which supports the ears O'. When the casing is turned up and down around neck K' for vertical adjustment, the ring N', around which the groove turns, is adjusted vertically in accordance with such adjustment of the casing. The relief-ring thus supported and adjusted by a movable muffler-casing constitutes one of the chief features of my present invention.

I claim—

1. The combination, in a safety-valve, of a base provided with a valve-seat, a valve provided with an annular groove in its under side and outside of the valve-seat, means for pressing said valve to its seat against the pressure of steam beneath it, a casing surrounding said valve and supported by the base, and having a threaded neck extending upward from a perforated top of the casing, a second perforated casing surrounding the first and adjustably supported by the neck of the inner casing, and a relief-ring surrounding the valve and supported by the outer casing and adjustable vertically therewith through its movable connection with the supporting-neck; all substantially as and for the purposes specified.

2. The combination, in a safety-valve, of a base provided with a valve-seat; a valve having an annular groove in its under side outside of the valve-seat; means for pressing the valve to its seat against the pressure of steam beneath it; a casing surrounding the valve and supported by the base and having a threaded neck extending upward from the perforated top of the casing; a second perforated casing surrounding the first and adjustably supported by the neck of the inner casing; a ring surrounding the valve and supported by and movable with the outer, vertically-adjustable casing; and a muffler-cap threaded on the neck of the inner casing and extending over all forming an expanded auxiliary muffler; all substantially as and for the purposes specified.

3. In a safety-valve, the combination of a valve-seat, valve, depressing-spring, relief-ring and inclosing muffler-case, the latter being movable and vertically adjustable and the ring being attached directly thereto and adjustable thereby, substantially as and for the purposes specified.

4. A safety-valve embodying the combination of a base A having a valve-seat B: a valve C, having an annular groove C' in its under side: a spindle D, seated in the valve: a depressing-spring E: a pressure-adjusting screw F: a casing H, screwed to the base and having a perforated top and a threaded neck K extending upward therefrom: a nut L threaded upon the neck: a ring L', threaded upon the nut: a perforated casing M, suspended by the nut L and ring L' from neck K, and vertically adjustable thereon: a relief-ring N connected through openings in case H, with case M, so as to be movable up and down therewith: and an expansive muffler-cap R, screwed to the top of neck K, and arranged to extend over all and inclose the tops of the inner casings: all substantially as and for the purposes specified.

ANTON LOHBILLER.

Witnesses:
EUGENE HUMPHREY,
WM. R. PATTERSON.